(12) United States Patent
Takubo et al.

(10) Patent No.: US 11,861,439 B2
(45) Date of Patent: Jan. 2, 2024

(54) ANTENNA DEVICE, CONTROL METHOD, AND PROGRAM

(71) Applicant: SONY GROUP CORPORATION, Tokyo (JP)

(72) Inventors: Hiroyuki Takubo, Chiba (JP); Masuo Murakami, Tokyo (JP); Shinya Kato, Tokyo (JP); Yuji Hiura, Kanagawa (JP); Junya Matsui, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 17/641,021

(22) PCT Filed: Oct. 5, 2020

(86) PCT No.: PCT/JP2020/037695
§ 371 (c)(1),
(2) Date: Mar. 7, 2022

(87) PCT Pub. No.: WO2021/075291
PCT Pub. Date: Apr. 22, 2021

(65) Prior Publication Data
US 2022/0335264 A1  Oct. 20, 2022

(30) Foreign Application Priority Data
Oct. 15, 2019  (JP) .................. 2019-188849

(51) Int. Cl.
*G06K 19/073* (2006.01)
*G06K 19/077* (2006.01)
*G06K 19/06* (2006.01)

(52) U.S. Cl.
CPC . *G06K 19/07345* (2013.01); *G06K 19/06187* (2013.01); *G06K 19/07767* (2013.01); *G06K 19/07779* (2013.01)

(58) Field of Classification Search
CPC ......... G06K 7/10366; G06K 19/07345; G06K 17/0029; G06K 19/06187;
(Continued)

(56) References Cited

U.S. PATENT DOCUMENTS

| 2006/0092081 A1* | 5/2006 | Kanazawa | ............... H01Q 9/30 343/702 |
| 2006/0220795 A1* | 10/2006 | Limbachiya | ..... G06K 19/07749 340/10.5 |
| 2017/0109730 A1* | 4/2017 | Locke | .................... G06K 19/02 |

FOREIGN PATENT DOCUMENTS

| EP | 1408457 A2 * | 4/2004 | ......... G07C 9/00309 |
| JP | 2011-228841 A | 11/2011 | |

(Continued)

OTHER PUBLICATIONS

Wang et al., "FPGA-Based Control Module for Millimeter Wave Imaging System" (Year: 2017).*

*Primary Examiner* — Thien T Mai
(74) *Attorney, Agent, or Firm* — Paratus Law Group, PLLC

(57) ABSTRACT

There is provided an antenna device, a control method, and a program that control enabling or disabling of a plurality of IC card antennas by using a mobile terminal. The antenna device includes: a mobile terminal antenna that receives a radio wave output by a reader/writer provided in a mobile terminal; a plurality of IC card antennas that communicates with an IC card including an IC chip for the IC card that reads/writes data in a contactless manner in response to a command transmitted by the reader/writer; and a control circuit that operates by using power generated when the mobile terminal antenna receives the radio wave output by the reader/writer and controls enabling or disabling of each of the IC card antennas in response to the command transmitted by the reader/writer. The present technology is appli- (Continued)

cable to a playmat used for a card game using a smartphone having an NFC function and an IC card.

12 Claims, 16 Drawing Sheets

(58) Field of Classification Search
CPC ....... G06K 19/07767; G06K 19/07779; G06K 19/0739; G06K 7/0095; G06K 19/0723; G06K 19/07749; G06K 7/10237; H04W 4/80; H01Q 7/00; H01Q 1/2216; H01Q 1/243; H01Q 1/521; H01Q 3/24
See application file for complete search history.

(56) References Cited

FOREIGN PATENT DOCUMENTS

| | | | | |
|---|---|---|---|---|
| JP | 2011228841 A | * | 11/2011 | |
| JP | 2014-120936 A | | 6/2014 | |
| JP | 2014-120937 A | | 6/2014 | |
| JP | 2014120937 A | * | 6/2014 | |
| JP | 2015-070381 A | | 4/2015 | |

* cited by examiner

FIG. 6

| STATE | NFC IC | EXTENSION ANTENNA 23-1 | EXTENSION ANTENNA 23-2 |
|---|---|---|---|
| | SHORT-CIRCUIT | OPEN | OPEN |
| | OPEN | SHORT-CIRCUIT | OPEN |
| | OPEN | OPEN | SHORT-CIRCUIT |

ANTENNA DEVICE, CONTROL METHOD, AND PROGRAM

CROSS REFERENCE TO PRIOR APPLICATION

This application is a National Stage Patent Application of PCT International Patent Application No. PCT/JP2020/037695 (filed on Oct. 5, 2020) under 35 U.S.C. § 371, which claims priority to Japanese Patent Application No. 2019-188849 (filed on Oct. 15, 2019), which are all hereby incorporated by reference in their entirety.

TECHNICAL FIELD

The present technology relates to an antenna device, a control method, and a program, and particularly relates to an antenna device, a control method, and a program that control enabling or disabling of a plurality of IC card antennas by using a mobile terminal.

BACKGROUND ART

Mobile terminals such as smartphones in recent years generally have a near field communication (NFC) function. Such a smartphone can serve as an integrated circuit (IC) card (contactless IC card) or as a reader/writer that reads/writes data to/from an external IC card in a contactless manner by using an application.

By the way, an antenna of the reader/writer is arranged on the back of the smartphone in many cases. Therefore, in an application in which a user holds an IC card over the reader/writer antenna while viewing a display, it may be difficult to know which part of the back the IC card should be held over.

In view of this, various technologies for extending the reader/writer antenna have been proposed. For example, Patent Document 1 describes a technology for electrically connecting an antenna coupled with a loop antenna of an IC card by electromagnetic induction and an antenna coupled with a terminal antenna arranged in a smartphone by electromagnetic induction.

CITATION LIST

Patent Document

Patent Document 1: Japanese Patent Application Laid-Open No. 2014-120936

SUMMARY OF THE INVENTION

Problems to be Solved by the Invention

In the technology described in Patent Document 1, the reader/writer antenna and the extended IC card antenna have a one-to-one relationship, and it is difficult to extend the reader/writer antenna with respect to a plurality of IC card antennas.

The present technology has been made in view of such a circumstance, and an object thereof is to control enabling or disabling of a plurality of IC card antennas by using a mobile terminal.

Solutions to Problems

An antenna device according to a first aspect of the present technology includes: a mobile terminal antenna that receives a radio wave output by a reader/writer provided in a mobile terminal; a plurality of IC card antennas that communicates with an IC card including an IC chip for the IC card that reads/writes data in a contactless manner in response to a command transmitted by the reader/writer; and a control circuit that operates by using power generated when the mobile terminal antenna receives the radio wave output by the reader/writer and controls enabling or disabling of each of the IC card antennas in response to the command transmitted by the reader/writer.

A program according to a second aspect of the present technology causes a computer that controls a mobile terminal provided with a reader/writer to execute the processing of transmitting, to an antenna device including a mobile terminal antenna that receives a radio wave output by the reader/writer, a plurality of IC card antennas that communicates with an IC card including an IC chip for the IC card that reads/writes data in a contactless manner in response to a command transmitted by the reader/writer, and a control circuit that operates by using power generated when the mobile terminal antenna receives the radio wave output by the reader/writer and controls enabling or disabling of each of the IC card antennas in response to the command transmitted by the reader/writer, the command for controlling enabling or disabling of the IC card antennas from the reader/writer.

In the first aspect of the present technology, enabling or disabling of the IC card antennas provided in the antenna device is controlled in response to a command transmitted by the reader/writer provided in the mobile terminal.

In the second aspect of the present technology, a command for controlling enabling or disabling of the IC card antennas is transmitted from the reader/writer provided in the mobile terminal to the antenna device including the mobile terminal antenna that receives a radio wave output by the reader/writer, the plurality of IC card antennas that communicates with the IC card including the IC chip for the IC card that reads/writes data in a contactless manner in response to the command transmitted by the reader/writer, and the control circuit that operates by using power generated when the mobile terminal antenna receives the radio wave output by the reader/writer and controls enabling or disabling of each of the IC card antennas in response to the command transmitted by the reader/writer.

BRIEF DESCRIPTION OF DRAWINGS

FIG. 6 illustrates a combination of connection states between extension antennas or an NFC IC and a smartphone antenna.

MODE FOR CARRYING OUT THE INVENTION

Figure 1:
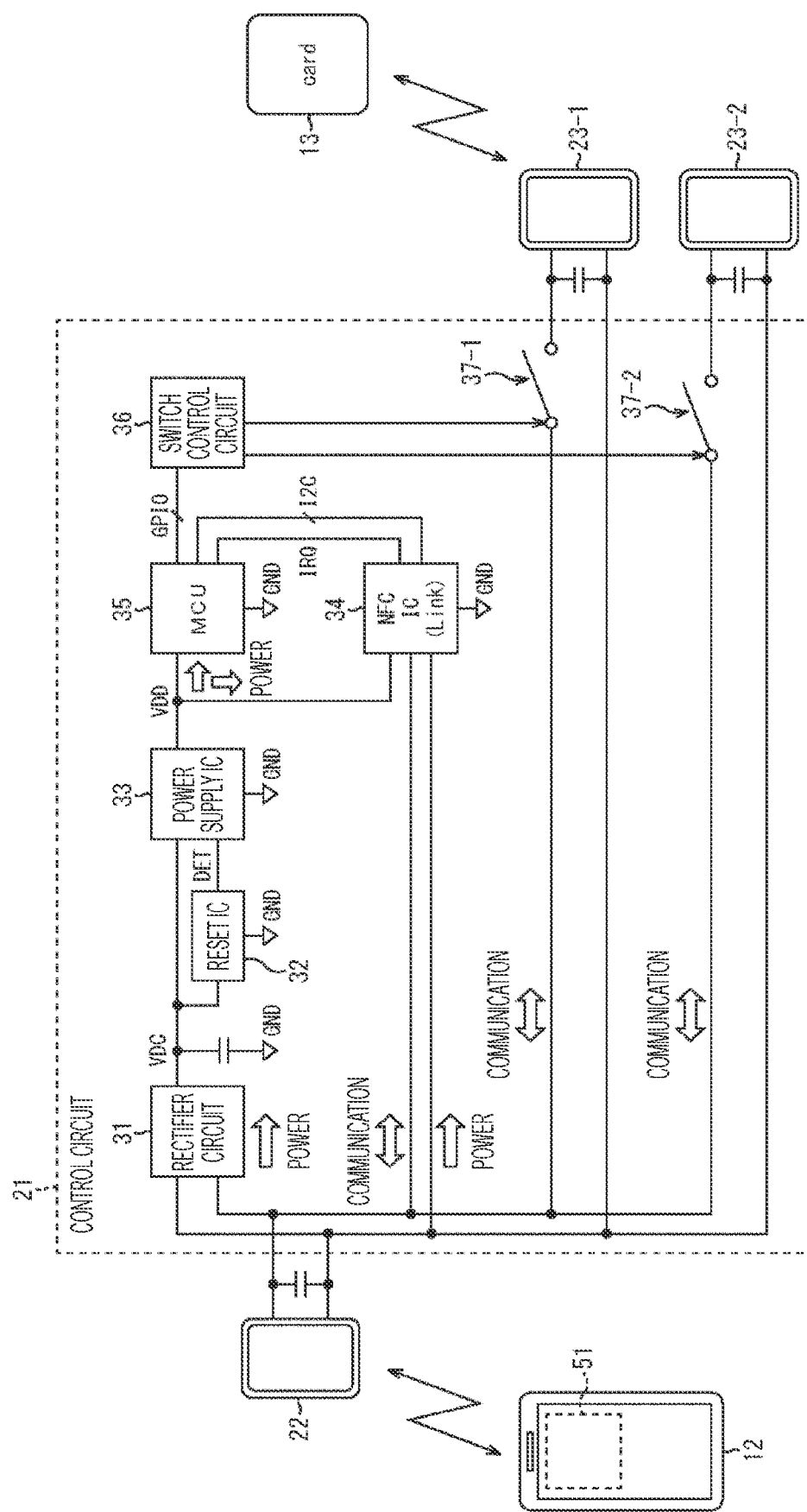
FIG. 1 illustrates a configuration example of an antenna device according to an embodiment of the present technology.

Hereinafter, modes for carrying out the present technology will be described. Description will be provided in the following order.

1. Overview of antenna device
2. Control of response of NFC IC
3. Reduction in influence of eddy currents
4. Modification example
5. Application example
6. Configuration of smartphone
7. Others 1. Overview of Antenna Device FIG. 1 illustrates a configuration example of an antenna device 11 according to an embodiment of the present technology.

In a case where an NFC device such as a smartphone 12 or IC card 13 is brought close to the antenna device 11, the antenna device 11 performs near field communication (NFC wireless communication) with such the NFC device.

Both the smartphone 12 and the IC card 13 are devices having a predetermined standard NFC communication function. For example, the smartphone 12 is provided with an NFC reader/writer 51 that is a reader/writer for NFC communication. Further, the IC card 13 is provided with an IC chip that performs NFC communication with an external reader/writer or the like and reads/writes data in response to a command transmitted by the reader/writer.

As illustrated in FIG. 1, the antenna device 11 is configured by connecting a smartphone antenna 22 and extension antennas 23-1 and 23-2 to a control circuit 21.

The smartphone 12 is held over the smartphone antenna 22 by a user.

Meanwhile, the IC card 13 is held over the extension antenna 23-1 or 23-2 by the user. The extension antennas 23-1 and 23-2 are antennas for the IC card 13. In the example of FIG. 1, the IC card 13 is held over the extension antenna 23-1. The IC card 13 may be held over the extension antenna 23-2, or two IC cards 13 may be held over the extension antennas 23-1 and 23-2, respectively.

As described above, the antenna device 11 has a single antenna for the smartphone 12 and a plurality of antennas for the IC card 13.

The control circuit 21 includes a rectifier circuit 31, a reset IC 32, a power supply IC 33, an NFC IC 34, a micro controller unit (MCU) 35, a switch control circuit 36, and switches 37-1 and 37-2. The smartphone antenna 22 is connected to the rectifier circuit 31 and the NFC IC 34. Further, the smartphone antenna 22 is connected to the extension antenna 23-1 via the switch 37-1 and is connected to the extension antenna 23-2 via the switch 37-2.

The rectifier circuit 31 generates a voltage direct current (VDC) when the smartphone antenna 22 receives radio waves output by the NFC reader/writer 51 provided in the smartphone 12. The VDC generated by the rectifier circuit 31 is supplied to the reset IC 32 and the power supply IC 33.

The reset IC 32 monitors the VDC. The reset IC 32 activates the power supply IC 33 in a case where the VDC reaches a predetermined reset release voltage.

The power supply IC 33 supplies VDD generated on the basis of the VDC to the NFC IC 34 and also supplies the VDD to the MCU 35.

The NFC IC 34 is an IC chip provided in the antenna device 11. The NFC IC 34 can be, for example, an IC chip compatible with the FeliCa (registered trademark) standard. The NFC IC 34 is an IC chip that can perform NFC communication of the same standard as an IC chip provided in the IC card 13.

At the same time when the VDD is supplied from the power supply IC 33 to the NFC IC 34, for example, power and a command signal corresponding to a carrier wave of 13.56 MHz are supplied from the smartphone antenna 22 to the NFC IC 34. The MCU 35 is activated in response to the supply of the VDD and operates in response to the command supplied from the smartphone antenna 22.

For example, a write command that is a command indicating enabling or disabling of the extension antennas is transmitted from the NFC reader/writer 51 of the smartphone 12. In a case where the smartphone antenna 22 receives the write command, the NFC IC 34 writes the write command to a memory in the NFC IC 34 and supplies the write command to the MCU 35 via an I2C bus. The NFC IC 34 functions as an IC chip in the antenna device 11 for controlling operation of the MCU 35 in response to the write command.

Note that enabling of the extension antenna means that the switch provided between the smartphone antenna 22 and the extension antenna is turned on so that the smartphone antenna 22 and the extension antenna have a short-circuit state (electrically connected state). In a case where the extension antenna is enabled, a signal transmitted from the NFC reader/writer 51 of the smartphone 12 and received by the smartphone antenna 22 is supplied to the extension antenna. Meanwhile, a signal transmitted from the IC card 13 and received by the extension antenna is supplied to the smartphone antenna 22.

Further, disabling of the extension antenna means that the switch provided between the smartphone antenna 22 and the extension antenna is turned off so that the smartphone antenna 22 and the extension antenna have an open state (electrically disconnected state).

The MCU 35 controls a general-purpose input/output (GPIO) in accordance with contents of the write command supplied from the NFC IC 34. In FIG. 1, the MCU 35 uses two GPIOs to cause the switch control circuit 36 to control both the switches 37-1 and 37-2. The MCU 35 is a controller that switches on/off each of the switches 37-1 and 37-2 in response to a write command so as to control enabling or disabling of the extension antennas.

The switch control circuit 36 switches on/off each of the switches 37-1 and 37-2 under the control of the MCU 35. Regarding a setting of switching on/off of the switches, time can also be set. For example, it is possible to set the switch 37-1 to be on for one second and the switch 37-2 to be on for five seconds.

The switch 37-1 is provided between the smartphone antenna 22 and the extension antenna 23-1.

The switch 37-2 is provided between the smartphone antenna 22 and the extension antenna 23-2.

Hereinafter, in a case where it is unnecessary to distinguish between the switches 37-1 and 37-2, the switches will collectively be referred to as "switches 37" as appropriate. Other configurations provided in pairs will be collectively described in a similar manner.

In the example of FIG. 1, the two extension antennas are provided, but three or more antennas may be provided as extension antennas for the IC card 13. In this case, the same number of switches as the number of extension antennas are provided between the smartphone antenna 22 and the extension antennas.

Here, processing performed between the antenna device 11 and the smartphone 12 having the above configuration will be described.

Figure 2:
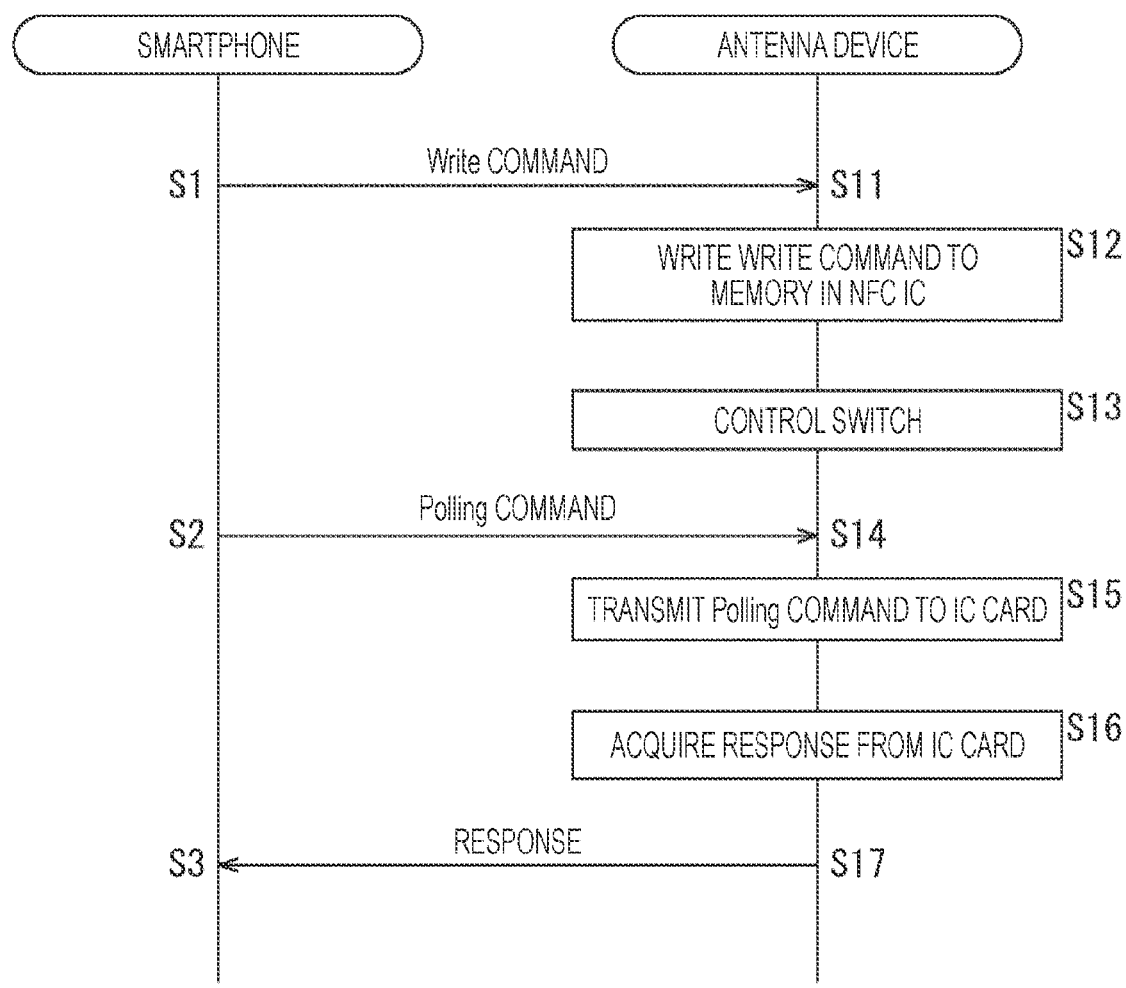
FIG. 2 is a sequence diagram showing a flow of processing performed by an antenna device and a smartphone.

FIG. 2 is a sequence diagram showing a flow of the processing performed by the antenna device 11 and the smartphone 12.

The processing described with reference to FIG. 2 is started when, for example, the smartphone 12 is held over the smartphone antenna 22 of the antenna device 11 and the smartphone antenna 22 receives a radio wave output by the NFC reader/writer 51. Each unit of the antenna device 11 is activated when power generated in response to reception of the radio wave output from the NFC reader/writer 51 by the smartphone antenna 22 is supplied to each unit thereof.

In step S1, the NFC reader/writer 51 of the smartphone 12 transmits a write command. Here, a case of enabling the extension antenna 23-1 and disabling the extension antenna 23-2 will be described. The IC card 13 is held over the extension antenna 23-1.

In step S11, the smartphone antenna 22 of the antenna device 11 receives the write command transmitted from the NFC reader/writer 51 of the smartphone 12.

In step S12, the NFC IC 34 of the antenna device 11 writes the write command to the memory in the NFC IC 34 and supplies the write command to the MCU 35.

In step S13, the MCU 35 of the antenna device 11 causes the switch control circuit 36 to control the switches 37 in response to the write command. For example, the switch control circuit 36 that has received the write command described above turns on the switch 37-1 and turns off the switch 37-2.

In step S2, the NFC reader/writer 51 of the smartphone 12 transmits a polling command that is a command for making an inquiry.

In step S14, the smartphone antenna 22 of the antenna device 11 receives the polling command transmitted from the NFC reader/writer 51 of the smartphone 12. The polling command received by the smartphone antenna 22 is supplied to the extension antenna 23-1 via the switch 37-1.

In step S15, the extension antenna 23-1 of the antenna device 11 transmits the polling command to the IC card 13 held over the extension antenna 23-1.

In step S16, the extension antenna 23-1 of the antenna device 11 receives a response from the IC card 13. The response to the polling command includes IDm that is identification information of the IC card 13. The IDm is identification information of the IC chip provided in the antenna device 11 or IC card 13. Note that another ID may be used as the identification information. The response received by the extension antenna 23-1 is supplied to the smartphone antenna 22 via the switch 37-1.

In step S17, the smartphone antenna 22 of the antenna device 11 transmits the response from the IC card 13 to the smartphone 12.

In step S3, the NFC reader/writer 51 of the smartphone 12 receives the response transmitted from the antenna device 11 as a response to the polling command. The smartphone 12 grasps that only the extension antenna 23-1 is enabled, and therefore the smartphone 12 can grasp that the IC card 13 is held over the extension antenna 23-1 and also grasp the IDm of the IC card 13 held over the extension antenna 23-1.

As described above, the antenna device 11 can extend the antenna of the NFC reader/writer 51 provided in the smartphone 12 to a plurality of extension antennas. Further, the antenna device 11 can perform an operation related to switching for enabling or disabling the plurality of extension antennas, without receiving power from the outside.

The smartphone 12 can enable or disable the extension antennas 23 by using a command compatible with the IC chip provided in the IC card 13 or the NFC IC 34 that is an internal IC chip. The IC chip provided in the IC card 13 is an IC chip for an IC card, which reads/writes data in a contactless manner in response to a command transmitted by the NFC reader/writer 51 of the smartphone 12. The internal IC chip is an IC chip that controls operation of the MCU 35 in response to a command and reads/writes data in a contactless manner in response to a command.

2. Control of Response of NFC IC

In the present technology, after a specific extension antenna 23 is selected and enabled by the smartphone 12, NFC communication is desirably performed only between the IC card 13 held over the enabled extension antenna 23 and the smartphone 12.

Figure 3:
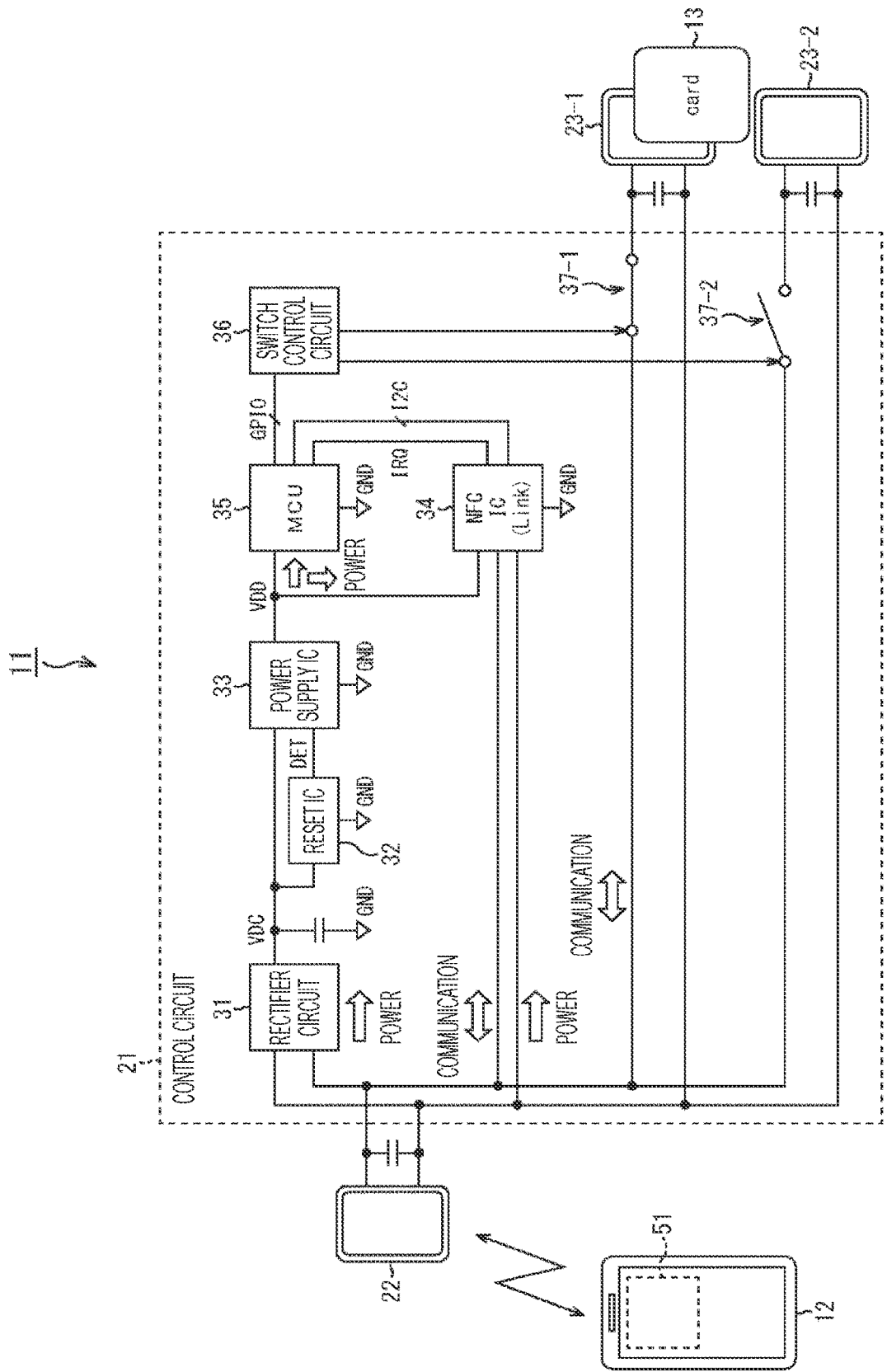
FIG. 3 illustrates an example of an antenna device in which an extension antenna is enabled.

For example, in a case where the extension antenna 23-1 is enabled as illustrated in FIG. 3, a command transmitted from the NFC reader/writer 51 of the smartphone 12 is desirably supplied only to the IC card 13 held over the extension antenna 23-1, and a response from the IC card 13 held over the extension antenna 23-1 is desirably returned to the smartphone 12.

Because the control circuit 21 of the antenna device 11 is provided with the NFC IC 34 capable of performing NFC communication, the NFC IC 34 may respond to a command transmitted by the smartphone 12.

As a method of restraining the NFC IC 34 from responding, there are the following two methods: a method using a polling disable function; and a method using a switch connected to the NFC IC 34.

Method Using Polling Disable Function

The polling disable function prevents the IC chip from responding even if a polling command is transmitted from the NFC reader/writer 51. The polling disable function is enabled in response to reception of a polling disable command.

Figure 4:
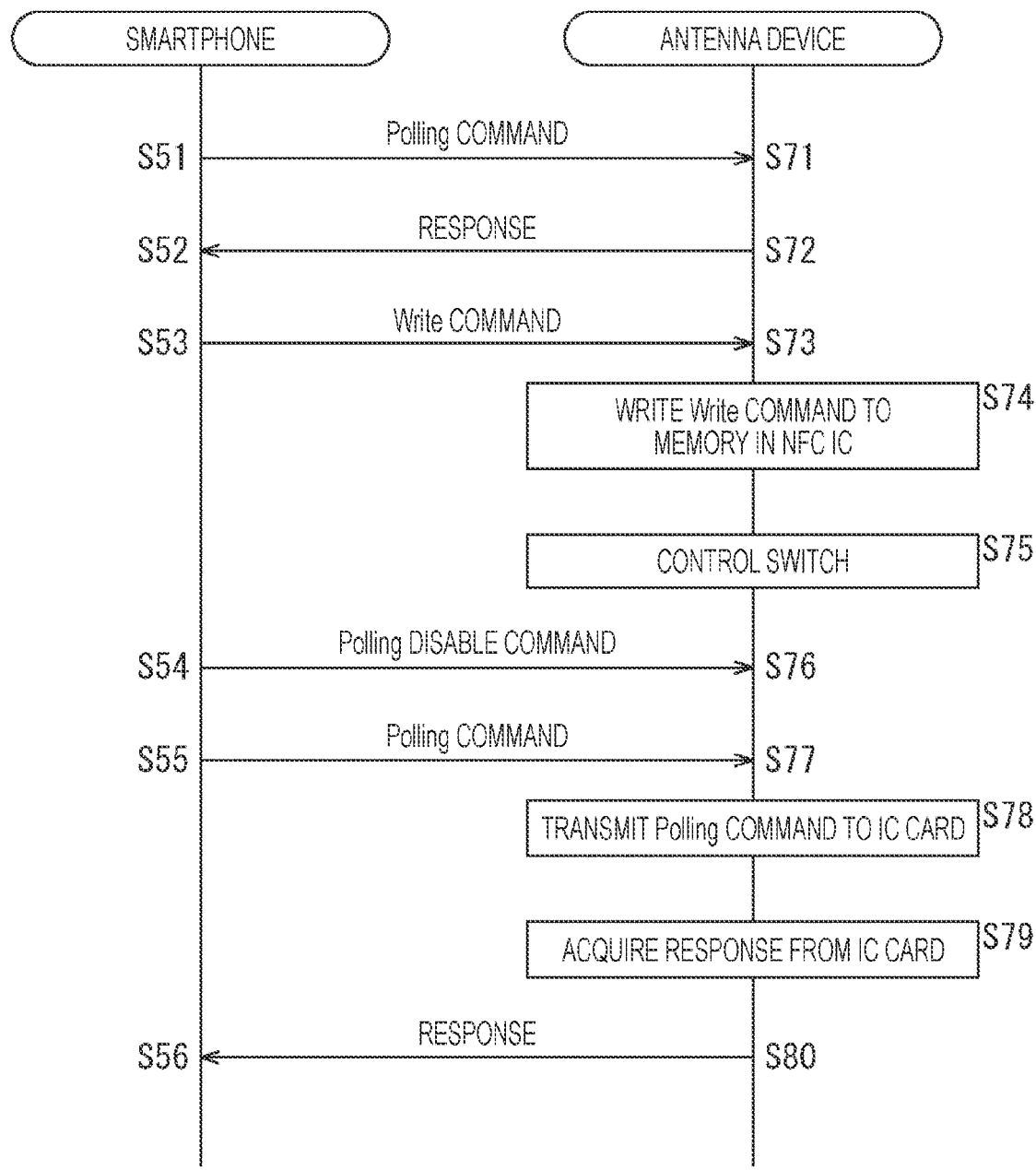
FIG. 4 is a sequence diagram showing a flow of processing using a polling disable function.

FIG. 4 is a sequence diagram showing a flow of processing using the polling disable function.

The processing described with reference to FIG. 4 is also started when, for example, the smartphone 12 is held over the smartphone antenna 22 of the antenna device 11 and the smartphone antenna 22 receives a radio wave output by the NFC reader/writer 51. The extension antennas 23-1 and 23-2 are open as a default state.

In step S51, the NFC reader/writer 51 of the smartphone 12 transmits a polling command.

In step S71, the smartphone antenna 22 of the antenna device 11 receives the polling command transmitted from the NFC reader/writer 51 of the smartphone 12.

In step S72, the NFC IC 34 of the antenna device 11 supplies a response to the polling command to the smartphone antenna 22. The smartphone antenna 22 transmits the response supplied from the NFC IC 34 to the smartphone 12. The response from the NFC IC 34 includes IDm that is identification information of the NFC IC 34.

In step S52, the NFC reader/writer 51 of the smartphone 12 receives the response from the NFC IC 34.

In step S53, the NFC reader/writer 51 of the smartphone 12 transmits a write command for enabling the extension antenna 23-1.

Processes in steps S73 to S75 in the antenna device 11 are similar to the processes in steps S11 to S13 of FIG. 2. That is, the switch 37-1 is turned on and the switch 37-2 is turned off in response to the write command.

In step S54, the NFC reader/writer 51 of the smartphone 12 transmits a polling disable command while specifying the NFC IC 34 on the basis of the IDm of the NFC IC 34 included in the response received in step S52.

In step S76, the smartphone antenna 22 of the antenna device 11 receives the polling disable command transmitted from the NFC reader/writer 51 of the smartphone 12. The NFC IC 34 stops responding to the polling command in response to the supply of the polling disable command. Note that polling disable is automatically canceled when the NFC IC 34 is reset.

In step 555, the NFC reader/writer 51 of the smartphone 12 transmits a polling command.

Processes in steps S77 to S80 in the antenna device 11 are similar to the processes in steps S14 to S17 of FIG. 2. That is, the polling command is transmitted from the extension antenna 23-1 to the IC card 13, and a response from the IC card 13 is received by the extension antenna 23-1. The response from the IC card 13 received by the extension antenna 23-1 is transmitted from the smartphone antenna 22 to the smartphone 12.

Note that, because the polling disable function is enabled, the NFC IC 34 does not respond even if the polling command is supplied.

In step S56, the NFC reader/writer 51 of the smartphone 12 receives the response from the IC card 13. After that, in a case where the smartphone 12 performs NFC communication with the IC card 13 held over the extension antenna 23-1, the smartphone 12 transmits a command while specifying the IDm of the IC card 13 included in the response.

As described above, the antenna device 11 can restrain operation of the NFC IC 34 so that the NFC IC 34 do not respond after a specific extension antenna 23 is enabled under the control of the smartphone 12.

Method Using Switch Connected to NFC IC

Figure 5:
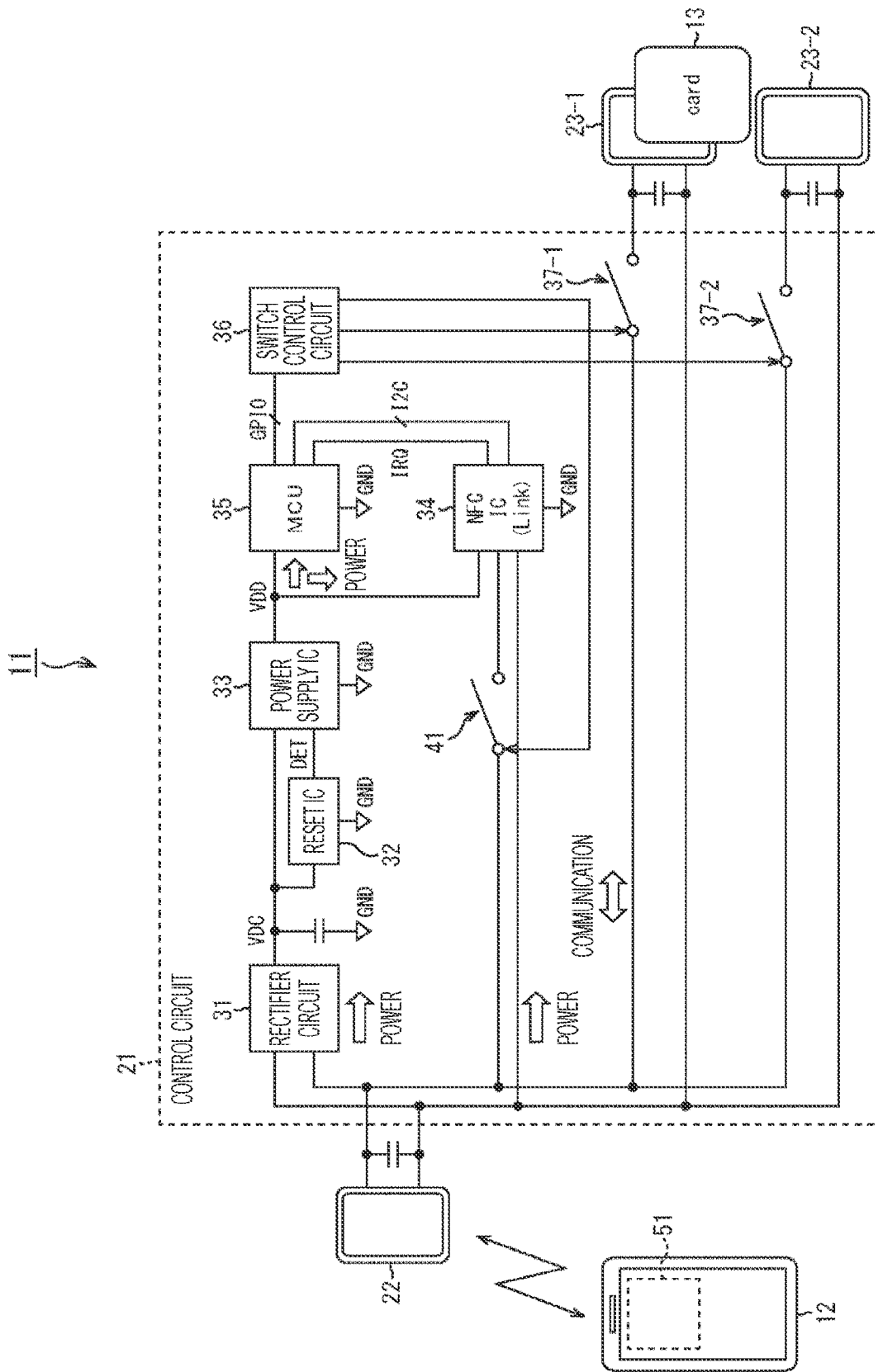
FIG. 5 illustrates another configuration example of an antenna device.

FIG. 5 illustrates another configuration example of the antenna device 11.

In FIG. 5, the same components as those of the antenna device 11 in FIG. 1 are denoted by the same reference signs. Redundant description will be omitted as appropriate. The same applies to FIG. 9 described later.

The configuration of the control circuit 21 in FIG. 5 is different from the configuration described with reference to FIG. 1 in that a switch 41 is provided between the smartphone antenna 22 and the NFC IC 34. The switch 41 is connected to the switch control circuit 36.

That is, the MCU 35 causes the switch control circuit 36 to control not only the switches 37-1 and 37-2 that are switches for the extension antennas, but also the switch 41 that is a switch for the NFC IC 34.

The switch control circuit 36 controls on/off of the switch 41 as well as on/off of the switches 37-1 and 37-2 under the control of the MCU 35. For example, states of the switches 37 and a state of the switch 41 are exclusively controlled.

FIG. 6 illustrates a combination of connection states between the extension antennas 23 or the NFC IC 34 and the smartphone antenna 22.

As shown in the second line of FIG. 6, a default state is such that a connection between the smartphone antenna 22 and the NFC IC 34 is short-circuited and connections between the smartphone antenna 22 and the extension antennas 23-1 and 23-2 are open.

Meanwhile, as shown in the third line of FIG. 6, in a case where the connection between the smartphone antenna 22 and the extension antenna 23-1 is short-circuited and the extension antenna 23-1 is enabled, the connection between the smartphone antenna 22 and the NFC IC 34 is open. Further, the connection between the smartphone antenna 22 and the extension antenna 23-2 is also open.

Meanwhile, as shown in the fourth line of FIG. 6, in a case where the connection between the smartphone antenna 22 and the extension antenna 23-2 is short-circuited and the extension antenna 23-2 is enabled, the connection between the smartphone antenna 22 and the NFC IC 34 is open. Further, the connection between the smartphone antenna 22 and the extension antenna 23-1 is also open.

That is, in a case where any one of the extension antennas 23 is enabled, the connection between the smartphone antenna 22 and the NFC IC 34 is open. In this case, the NFC reader/writer 51 of the smartphone 12 cannot perform NFC communication with the NFC IC 34.

Note that, in a case where output of radio waves by the NFC reader/writer 51 of the smartphone 12 is stopped, each connection state returns to the default state, and the smartphone antenna 22 and the NFC IC 34 are short-circuited.

As described above, also by switching on/off the switch 41 that is a switch for the NFC IC 34, the antenna device 11 can control operation of the NFC IC 34 so that the NFC IC 34 does not respond.

3. Reduction in Influence of Eddy Currents

Figure 7:
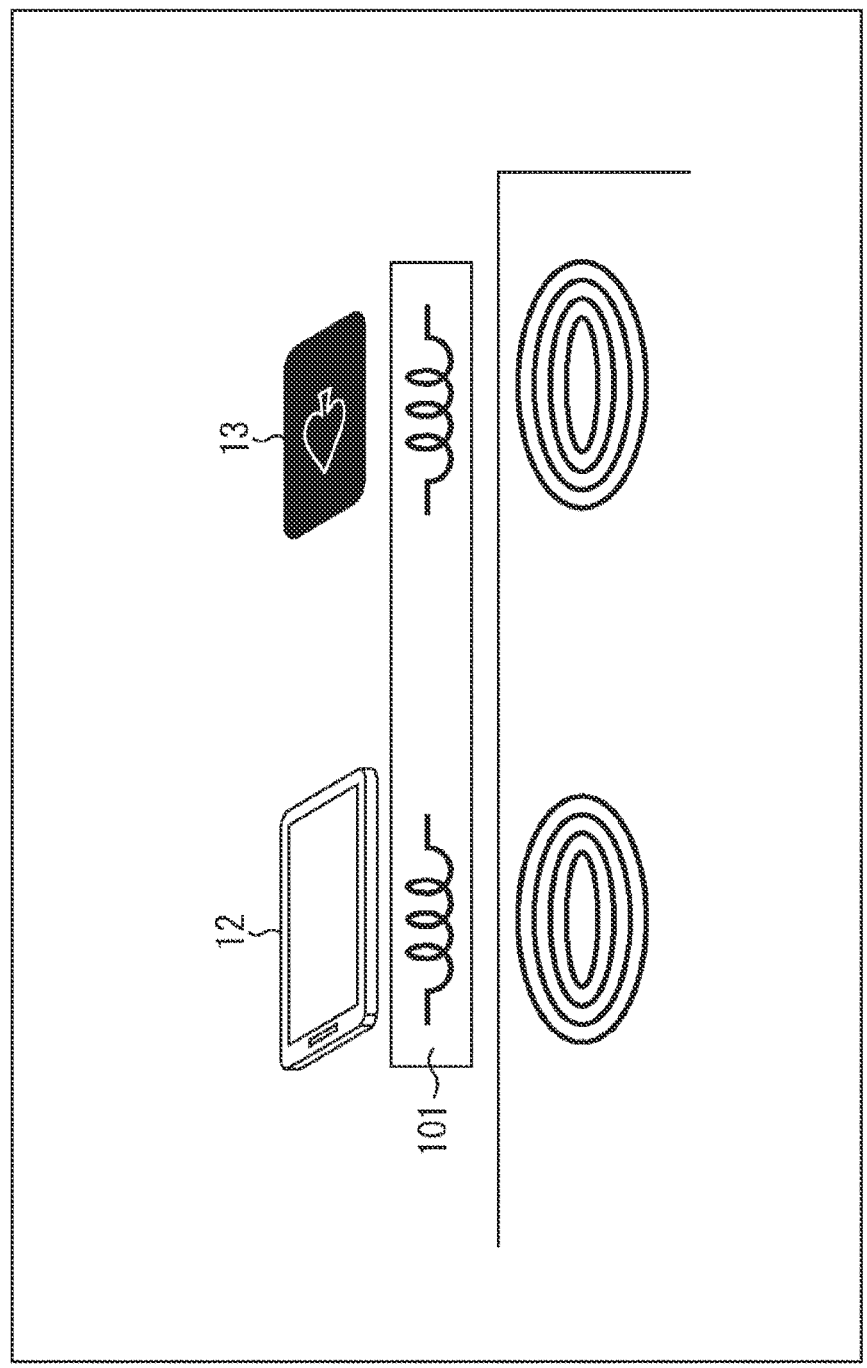
FIG. 7 illustrates eddy currents generated in a metal plate.

Generally, in a case where an NFC device is placed near a metal plate such as a desk having a metal top plate as illustrated in FIG. 7, communication performance is reduced because eddy currents are generated in the metal plate. In order to reduce an influence of generation of the eddy currents, it is possible to provide a magnetic sheet and a metal plate on a bottom surface side of the antenna device 11.

Figure 8:
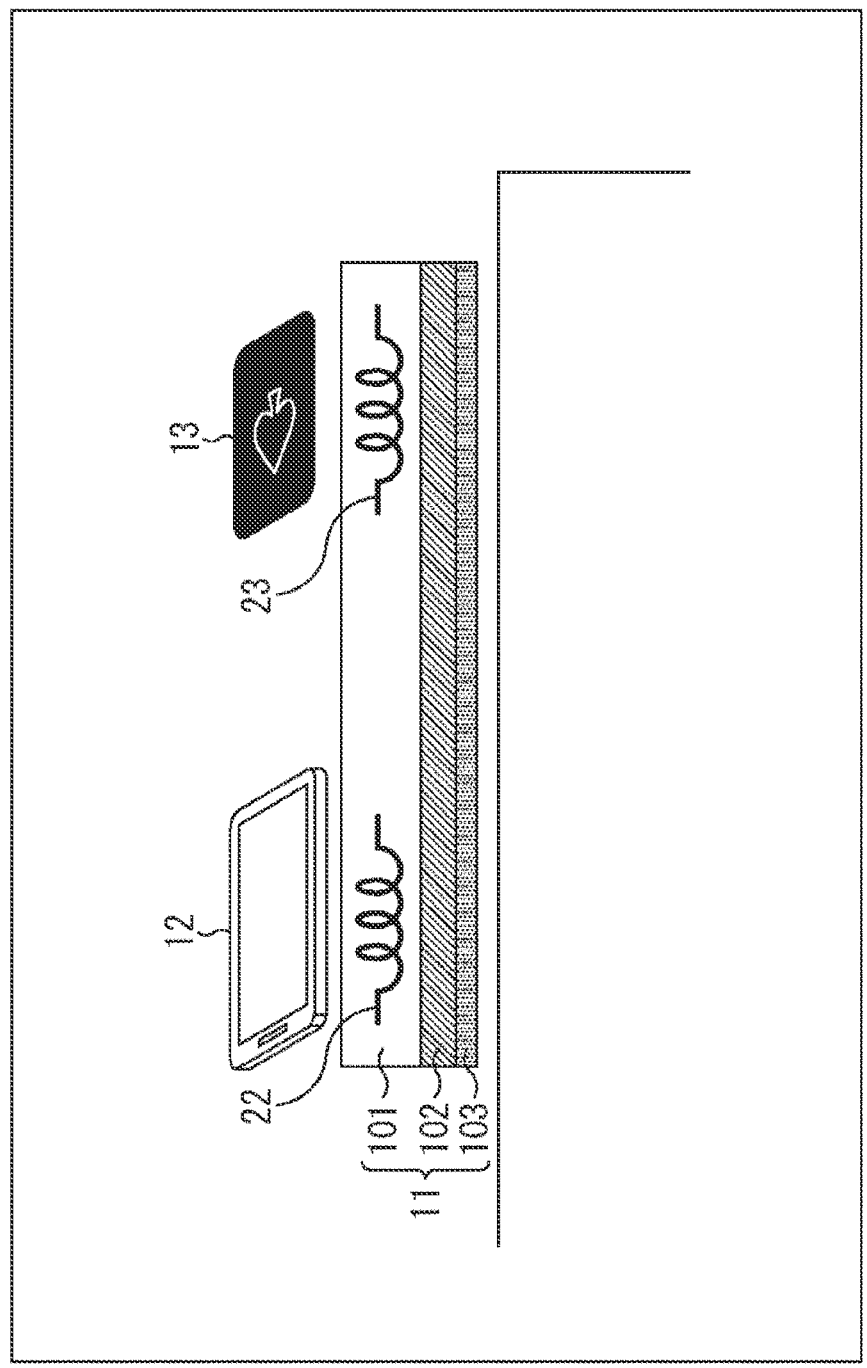
FIG. 8 illustrates an example of a layered structure of an antenna device.

FIG. 8 illustrates an example of a layered structure of the antenna device 11.

As illustrated in FIG. 8, the antenna device 11 has a layered structure including an antenna layer 101, a magnetic layer 102, and a metal layer 103.

The antenna layer 101 is a layer on which the smartphone antenna 22 and the extension antenna 23 are provided. A substrate on which the control circuit 21 and the like are arranged is also provided on the antenna layer 101, for example.

As illustrated in FIG. 8, the antenna layer 101 is provided on a surface side of the antenna device 11. The antenna layer 101 is made from a material such as, for example, rubber, urethane, or leather, except for each configuration described above such as the smartphone antenna 22 and the extension antennas 23.

The magnetic layer 102 is provided on a bottom surface side of the antenna layer 101 and is provided between the antenna layer 101 and the metal layer 103. The magnetic layer 102 is made from a magnetic material such as ferrite.

The metal layer 103 is provided on the bottom surface of the antenna device 11. The metal layer 103 is made from a thin-film metal material such as aluminum foil.

Because the magnetic layer 102 and the metal layer 103 are provided on the bottom surface side of the antenna layer 101, it is possible to control a direction of a magnetic field emitted from the smartphone antenna 22, the extension antennas 23, or the like and reduce generation of eddy currents.

By adjusting RF performance in accordance with such the layered structure, the antenna device 11 can have less changes in communication performance, i.e., can maintain stable communication performance.

Note that, in a case where each layer is made from a flexible material, the user can roll and carry the antenna device 11.

4. Modification Example

A light emitting diode (LED) may be provided in the antenna device 11.

Figure 9:
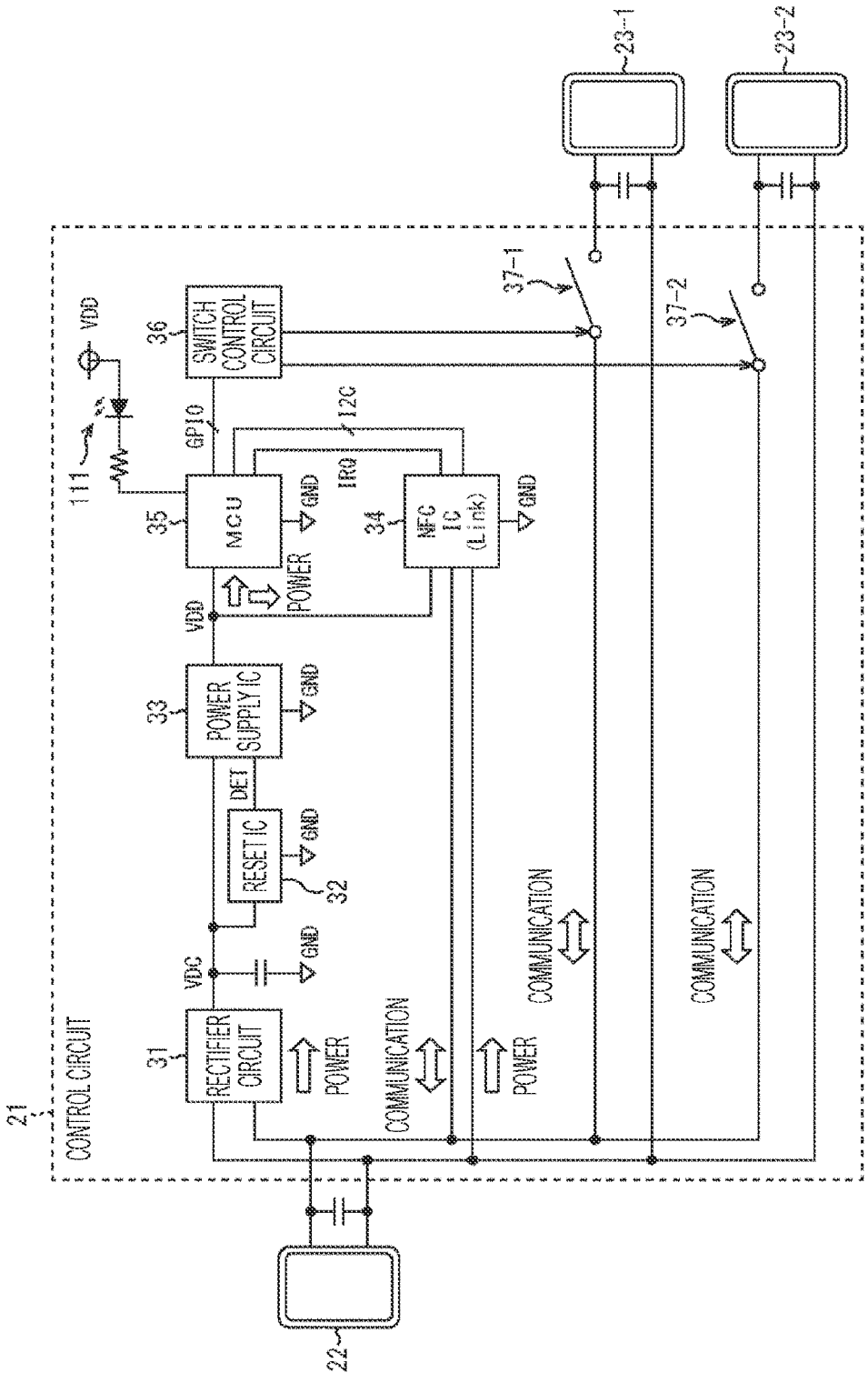
FIG. 9 illustrates a configuration example of an antenna device including an LED.

FIG. 9 illustrates a configuration example of the antenna device 11 including the LED.

The configuration of the control circuit 21 in FIG. 9 is different from the configuration described with reference to FIG. 1 in that an LED 111 is provided. The LED 111 is connected to the MCU 35.

The MCU 35 controls lighting, blinking, or extinguishing of the LED 111 in response to a command supplied from the NFC IC 34.

The LED 111 is a light emitting body that performs operations such as lighting, blinking, and extinguishing under the control of the MCU 35.

As described above, the antenna device 11 can emit light from the LED 111 or the like in response to a command output by the smartphone 12, without receiving an external power supply. A plurality of LEDs may be provided in the antenna device 11, for example, the same number of LEDs as the number of extension antennas 23 may be provided. It is possible to present enabling or disabling of the extension antennas 23 to the user by emitting light from the LEDs.

5. Application Example

Hereinafter, an application example of the antenna device 11 will be described. The antenna device 11 is applied to, for example, a playmat used as a field of a competitive card game. The game is played by arranging, on the playmat, IC cards 13 on which characters or the like are printed.

Figure 10:
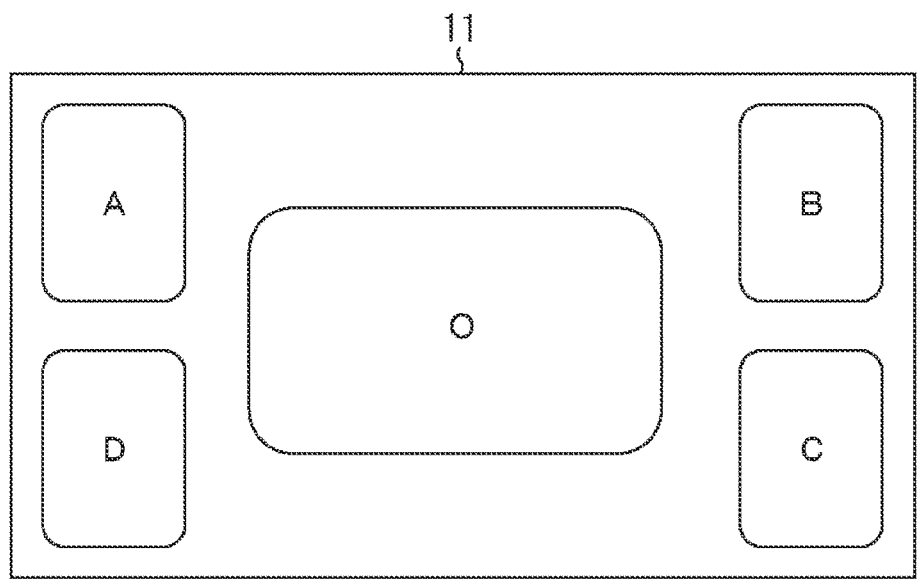
FIG. 10 is a top view illustrating an example of external appearance of an antenna device applied to a playmat.

FIG. 10 is a top view illustrating an example of external appearance of the antenna device 11 applied to the playmat.

As illustrated in FIG. 10, a section O is formed at substantially the center on a surface of the antenna device 11, and sections A to D are formed at upper, lower, left, and right corners. Each section is formed by, for example, printing a rectangular section on the surface of the antenna device 11.

The section O is a section for placing the smartphone 12. The control circuit 21 and the smartphone antenna 22 are arranged at positions on the back side of the section O.

The sections A to D are sections for placing the IC cards 13. Extension antennas 23-1 to 23-4 are arranged at positions on the back sides of the respective sections A to D. Here, the four extension antennas 23 are provided in the antenna device 11. Enabling or disabling of the four extension antennas 23 is controlled by the control circuit 21.

Figure 11:
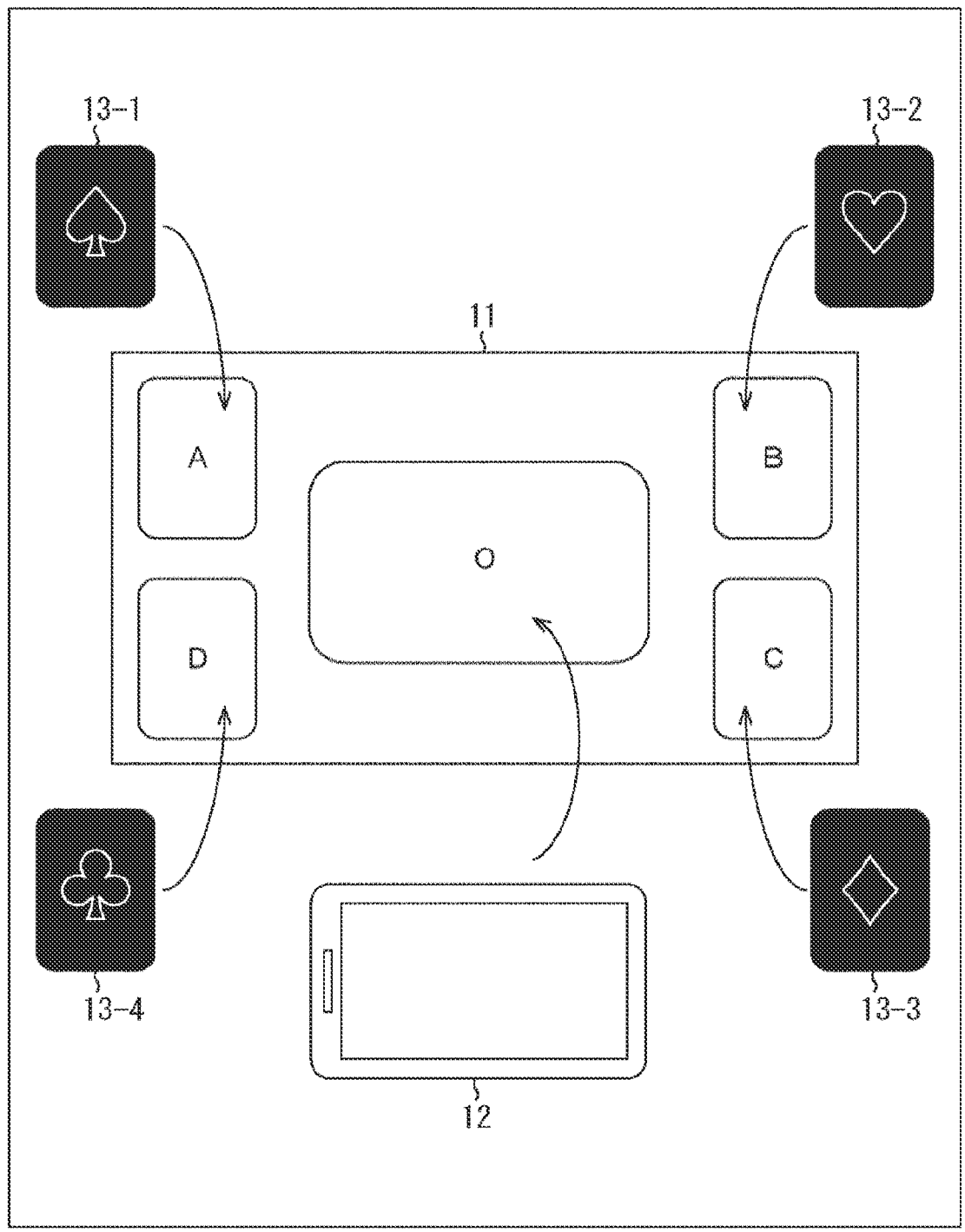
FIG. 11 illustrates how to use an antenna device.

FIG. 11 illustrates how to use the antenna device 11.

As illustrated in FIG. 11, the smartphone 12 in which a card game application program has been installed is placed on the section O of the antenna device 11.

Further, IC cards 13-1 to 13-4 that are the four IC cards 13 are placed on the sections A to D, respectively. Each card is marked with a spade, heart, diamond, and clover. Although the four IC cards 13 are used in FIG. 11, an arbitrary number of IC cards 13 are used in the card game.

Figure 12:
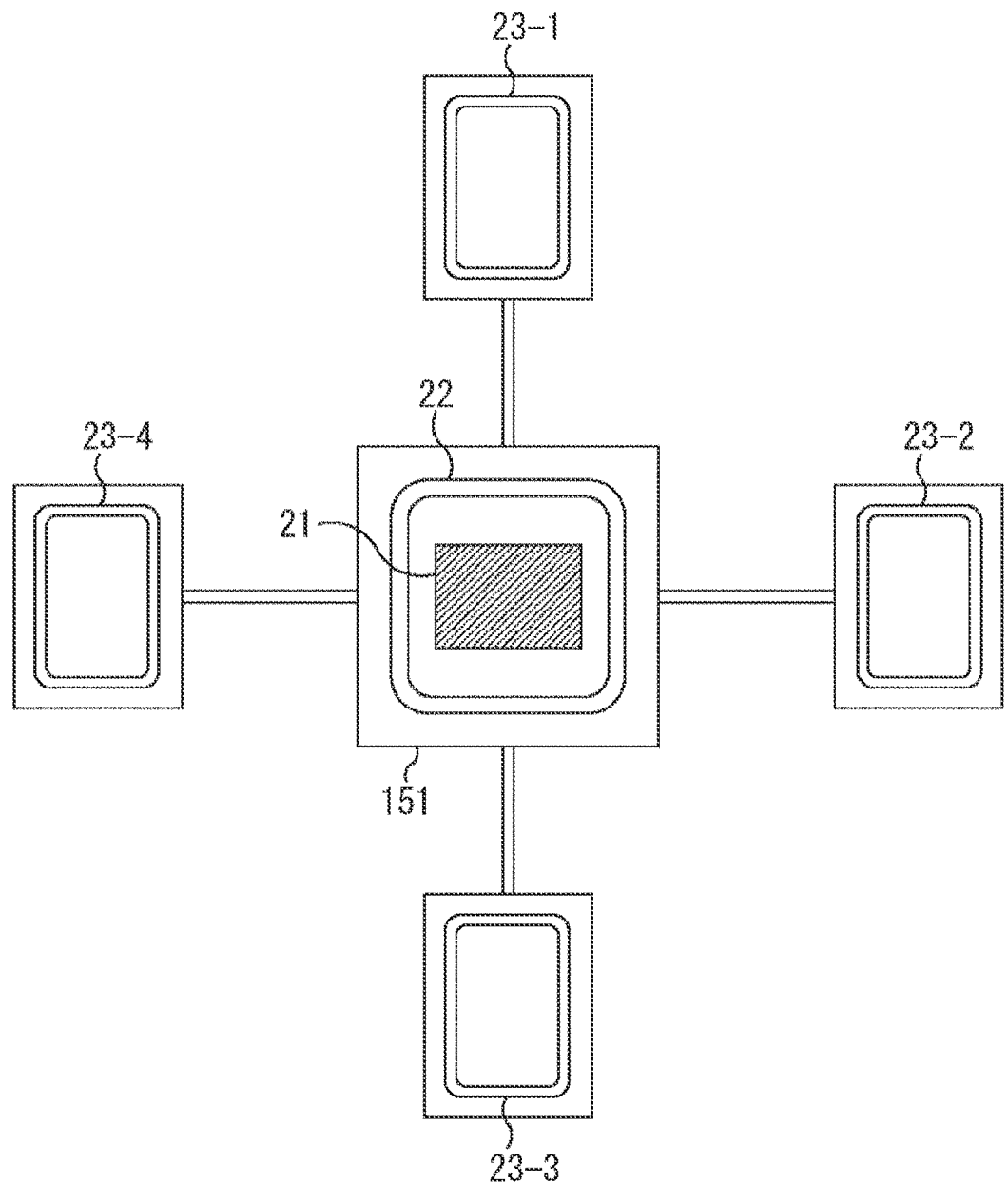
FIG. 12 illustrates an electrical configuration of an antenna device.

FIG. 12 illustrates an electrical configuration of the antenna device 11.

As illustrated in FIG. 12, the control circuit 21 and the smartphone antenna 22 are formed on a substrate 151. The substrate 151 is provided at a position corresponding to the section O. Members such as sheets on which the extension antennas 23-1 to 23-4 are arranged are provided at positions corresponding to the sections A to D.

Here, a flow of the card game will be described with reference to FIGS. 13 and 14.

The card game is started after, for example, the user activates the card game application program. As illustrated in an upper part of FIG. 13, the user places the smartphone 12 in which the card game application program has been activated on the section O.

A button TB including the word "Scan all" is displayed at the center of a display of the smartphone 12. Further, areas for displaying information of the IC cards 13 placed on the sections A to D are displayed at four corners of the display of the smartphone 12.

Figure 13:
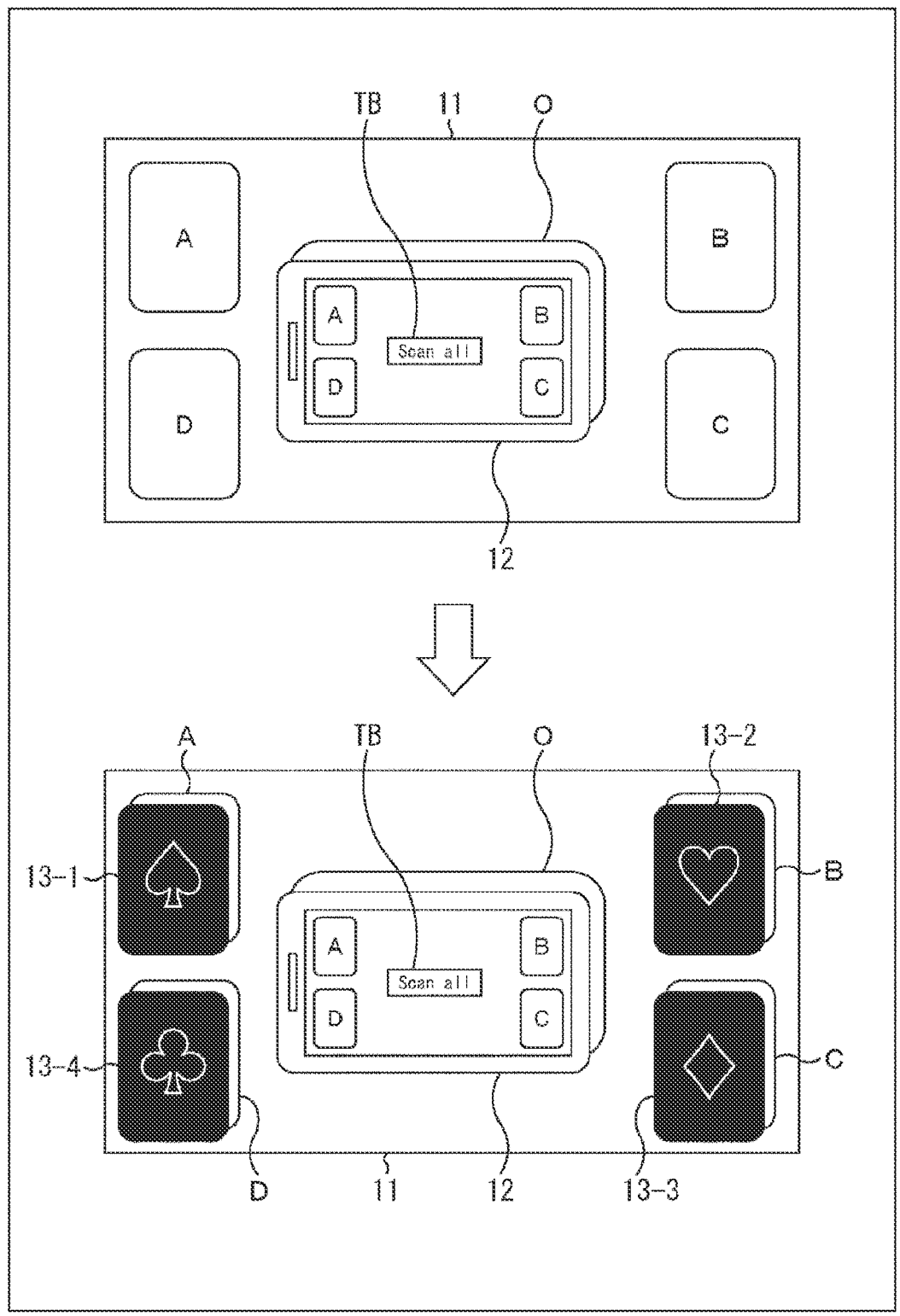
FIG. 13 is an explanatory diagram of a flow of a card game.

Further, as illustrated in a lower part of FIG. 13, the user places the IC cards 13-1 to 13-4 on the sections A to D, respectively.

Figure 14:
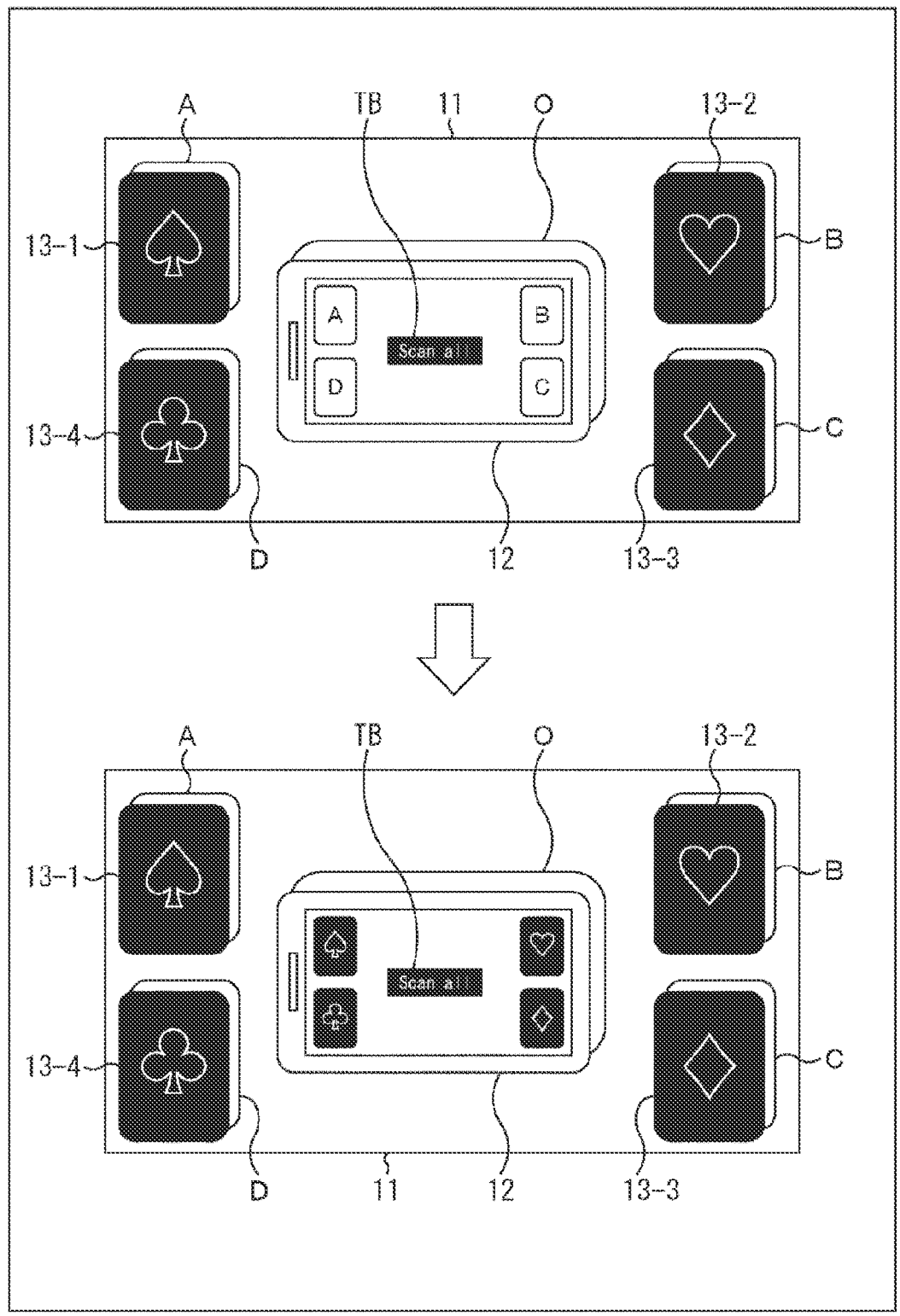
FIG. 14 is an explanatory diagram of a flow of a card game.

After placing the IC cards 13-1 to 13-4 on the sections A to D, the user touches the button TB as illustrated in an upper part of FIG. 14. In FIG. 14, the colored button TB means that the button TB has been touched.

In a case where the button TB is touched, each device performs the following operation.

First, the NFC reader/writer 51 of the smartphone 12 transmits a polling command.

The polling command received by the smartphone antenna 22 is supplied to the NFC IC 34.

The NFC IC 34 supplies, to the smartphone antenna 22, a response including the IDm that is the identification information of the NFC IC 34. The response including the IDm of the NFC IC 34 is transmitted to the smartphone 12.

Upon receipt of the response from the NFC IC 34, the NFC reader/writer 51 of the smartphone 12 selects one of the extension antennas 23 and transmits a write command for enabling the selected extension antenna 23. For example, the extension antennas are enabled in order from the extension antenna 23-1.

The write command received by the smartphone antenna 22 is supplied to the MCU 35. The MCU 35 causes the switch control circuit 36 to control on/off of the switches 37 in response to the write command. Therefore, a specific extension antenna 23 is enabled.

The NFC reader/writer 51 of the smartphone 12 transmits a polling disable command while specifying the IDm of the NFC IC 34. As described above, the NFC IC 34 stops responding to a polling command because the polling disable command has been transmitted.

Then, the NFC reader/writer 51 of the smartphone 12 transmits a polling command.

The polling command received by the smartphone antenna 22 is supplied to the enabled extension antenna 23. The enabled extension antenna 23 transmits the polling command to the IC card 13 placed on the extension antenna 23 and receives a response including the IDm that is the identification information of the IC card 13. The response from the IC card 13 is transmitted to the smartphone 12.

Upon receipt of the response from the IC card 13, the smartphone 12 detects that the IC card 13 is placed on the enabled extension antenna 23 and records the IDm thereof.

Next, the smartphone 12 reselects the extension antenna 23. That is, the smartphone 12 resets the NFC IC 34, cancels polling disable, and then transmits a write command to enable another extension antenna 23, and, after that, transmits a polling command. Upon receipt of a response to the polling command, the smartphone 12 records the IDm of the IC card 13 placed on the reselected and enabled extension antenna 23.

Reselection of the extension antenna 23, transmission of a polling command, and recording of IDm are repeated. The smartphone 12 can sequentially perform NFC communication with the IC cards 13-1 to 13-4 placed on the extension antennas 23-1 to 23-4 (sections A to D) and acquire IDm of each IC card.

After acquiring the IDm of the IC cards 13-1 to 13-4, as illustrated in a lower part of FIG. 14, the smartphone 12 displays the detected information of the IC cards 13 on the display on the basis of the IDm. In the example in the lower part of FIG. 14, images showing the IC cards 13-1 to 13-4 are displayed in respective display areas displayed on the display.

Note that not only the IDm of the IC cards 13 but also other information such as points used for the progress of the game is recorded on the IC chip of the IC card 13.

The smartphone 12 can read the points recorded on each of the IC cards 13-1 to 13-4 by using a read command. Further, the smartphone 12 can add or subtract the points recorded on each of the IC cards 13-1 to 13-4 by using a write command. The smartphone 12 can also read and display physical strength recorded on each of the IC cards 13-1 to 13-4 and can add or subtract an amount of money recorded on each of the IC cards 13-1 to 13-4.

The smartphone 12 can also identify the antenna device 11 as a playmat on the basis of the IDm that is the identification information of the NFC IC 34. The IDm of the NFC IC 34 is used as a mat ID. Note that the playmat may include storage means such as a memory, and the mat ID may be stored therein.

Total points that increase or decrease as the game progresses may be calculated by selecting a button displayed on the display of the smartphone 12.

Figure 15:
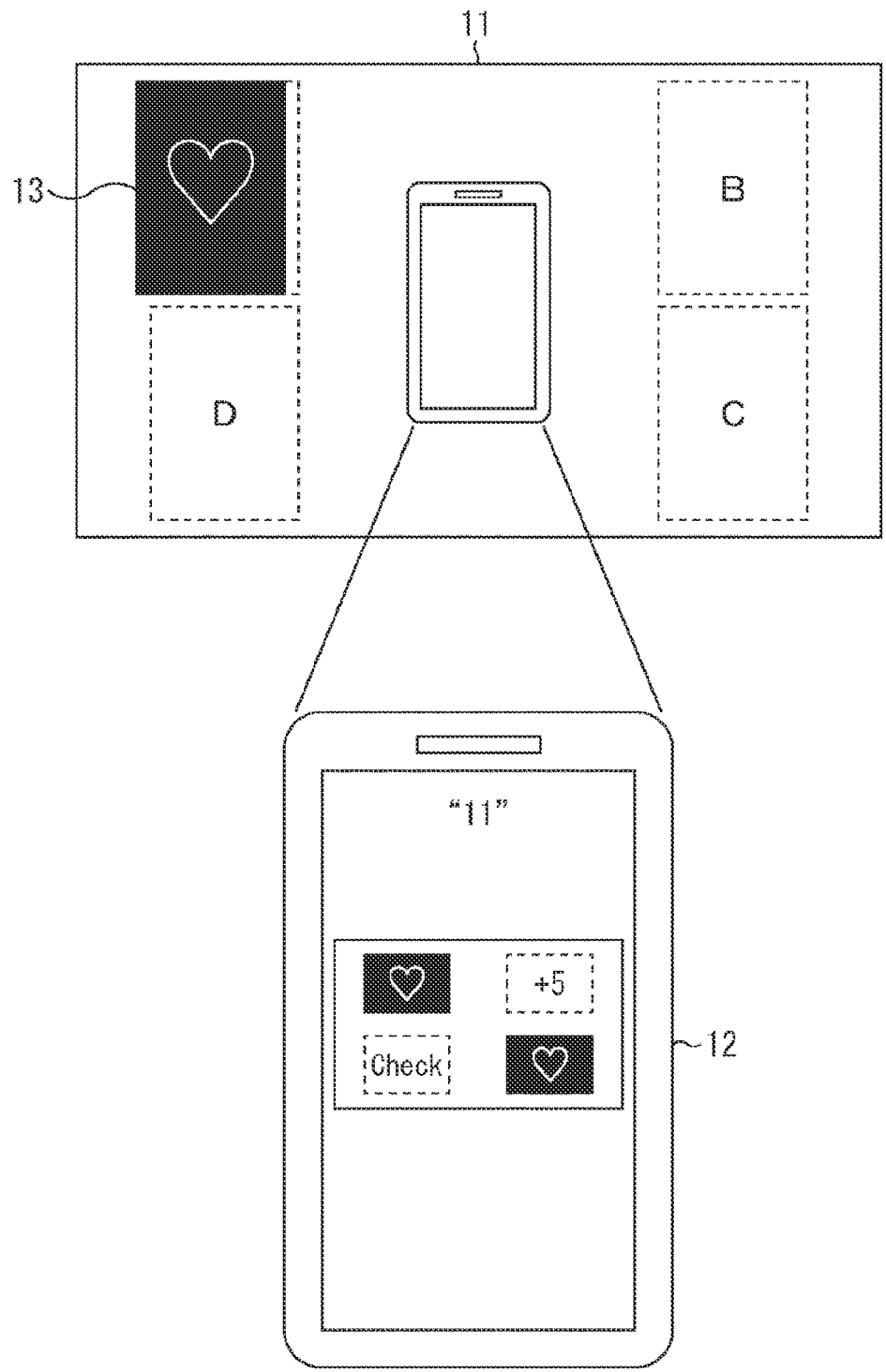
FIG. 15 illustrates an example of calculating total points.

FIG. 15 illustrates an example of calculating total points.

As illustrated in FIG. 15, in a case where the IC card 13 is placed on the section of the antenna device 11 and a button such as "+1", "+5", or "+10" displayed on the display of the smartphone 12 is selected, the points corresponding to the selected button are added to the points stored in the IC card 13.

Further, different points are added to points stored in the IC card 13 placed on another section of the antenna device 11.

In a case where a button including the word "Check" displayed on the display of the smartphone 12 is selected, total points are displayed on the display of the smartphone 12.

6. Configuration of Smartphone

Figure 16:
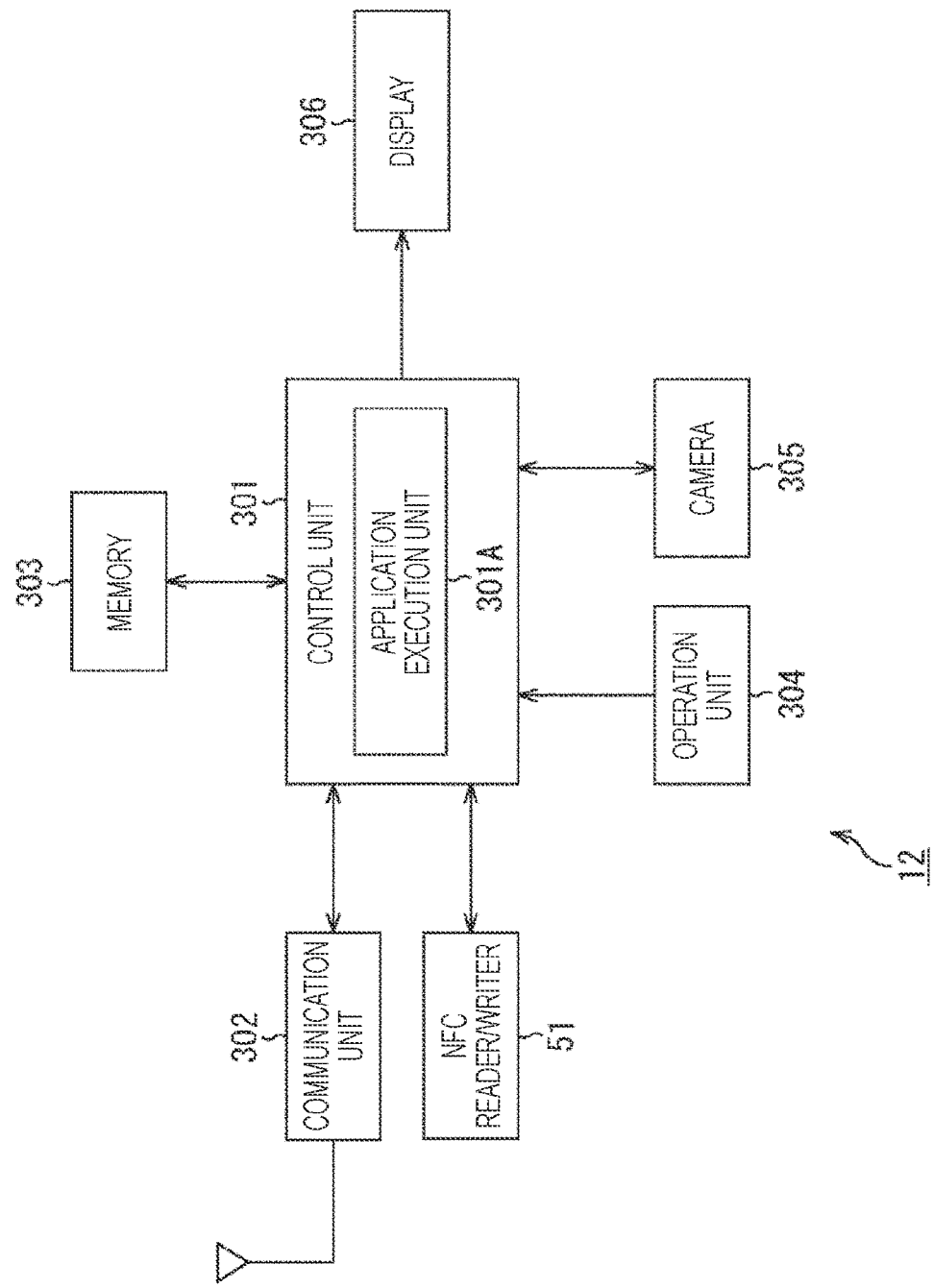
FIG. 16 is a block diagram illustrating a configuration example of a smartphone.

FIG. 16 is a block diagram illustrating a configuration example of the smartphone 12.

As illustrated in FIG. 16, the smartphone 12 includes not only the NFC reader/writer 51 but also a control unit 301, a communication unit 302, a memory 303, an operation unit 304, a camera 305, and a display 306.

The control unit 301 includes a central processing unit (CPU), a read only memory (ROM), a random access memory (RAM) and the like. The control unit 301 controls an entire operation of the smartphone 12 by executing a predetermined program.

The control unit 301 achieves an application execution unit 301A. The application execution unit 301A executes various programs such as a card game application program having a function of controlling the antenna device 11.

The communication unit 302 is a communication module for mobile communication such as Long Term Evolution (LTE). The communication unit 302 performs communication with an external device.

The memory 303 includes a flash memory or the like. The memory 303 stores various kinds of information such as the IDm of the NFC IC 34 and the IDm of the IC card 13 transmitted from the antenna device 11 and a program to be executed by the control unit 301.

The operation unit 304 includes various buttons and a touchscreen provided on the display 306. The operation unit 304 outputs a signal indicating content of a user operation to the control unit 301.

The camera 305 captures an image (moving image, still image) in response to a user operation.

The display 306 includes an organic EL display, an LCD, or the like. Various screens such as a card game screen are displayed on the display 306.

7. Others

The smartphone 12 is used as a mobile terminal for externally controlling operation of the antenna device 11, but various devices provided with an NFC reader/writer, such as a tablet terminal, wearable device, and PC, can be used as a mobile terminal.

The series of processing described above can be executed by hardware or software. In a case where the series of processing is executed by software, a program constituting the software is installed in a computer incorporated in dedicated hardware, a general-purpose personal computer, or the like.

The program to be installed is provided by being recorded on a removable medium including an optical disk (compact disc-read only memory (CD-ROM), digital versatile disc (DVD), or the like), a semiconductor memory, or the like. Further, the program may also be provided via a wired or wireless transmission medium such as a local area network, the Internet, or digital broadcasting. The program can be installed in a ROM or storage unit in advance.

Note that the program executed by the computer may be a program in which the processing is performed in time series in the order described in the present specification, or may be a program in which the processing is performed in parallel or at a necessary timing such as when a call is made.

The effects described in the present specification are merely illustrative and are not limited. Further, additional effects may be obtained.

The embodiments of the present technology are not limited to the above embodiments and can be variously modified without departing from the gist of the present technology.

Examples of Combination of Configurations

The present technology can also have the following configurations.

(1)

An antenna device including:
- a mobile terminal antenna that receives a radio wave output by a reader/writer provided in a mobile terminal;
- a plurality of IC card antennas that communicates with an IC card including an IC chip for the IC card that reads/writes data in a contactless manner in response to a command transmitted by the reader/writer; and
- a control circuit that operates by using power generated when the mobile terminal antenna receives the radio wave output by the reader/writer and controls enabling or disabling of each of the IC card antennas in response to the command transmitted by the reader/writer.

(2)

The antenna device according to (1), in which:
the control circuit includes
- a switch that is connected to each of the IC card antennas and switches enabling or disabling of the IC card antenna;
- a controller that controls the switch; and
- an internal IC chip that controls operation of the controller in response to the command and reads/writes data in a contactless manner in response to the command.

(3)

The antenna device according to (2), in which
in a case where the IC card antenna is enabled, the IC card antenna transmits the command supplied via the switch to the IC card and receives a response including identification information of the IC chip for the IC card transmitted from the IC card.

(4)

The antenna device according to (3), in which
the mobile terminal antenna transmits the response received by the IC card antenna to the mobile terminal.

(5)

The antenna device according to (4), in which:
the internal IC chip supplies another response including identification information of the internal IC chip to the mobile terminal antenna in response to the supply of the command; and
the mobile terminal antenna transmits the another response supplied from the internal IC chip to the mobile terminal.

(6)

The antenna device according to (5), in which
the internal IC chip stops responding to the another response in response to supply of a disable command serving as the command.

(7)

The antenna device according to (5), in which:
the controller further controls another switch provided between the mobile terminal antenna and the internal IC chip; and
the internal IC chip controls the operation of the controller to turn off the another switch in response to enabling of one of the IC card antennas.

(8)

The antenna device according to any one of (2) to (7), in which
the controller controls light emission of a light emitting body.

(9)

The antenna device according to any one of (5) to (8), in which
the identification information included in the another response is used in the mobile terminal as information for identifying the antenna device.

(10)

The antenna device according to any one of (1) to (9), in which
the antenna device has a layered structure including
- an antenna layer on which the IC card antennas and the mobile terminal antenna are provided,
- a magnetic layer made from a magnetic material and provided on a bottom surface side of the antenna layer, and
- a metal layer made from a metal material and provided on a bottom surface side of the magnetic layer.

(11)

The antenna device according to any one of (1) to (10), in which:
- a section for placing the mobile terminal is provided on a surface of the antenna device corresponding to a position of the mobile terminal antenna; and
- a section for placing the IC card is provided on the surface of the antenna device corresponding to a position of each of the plurality of IC card antennas.

(12)

A control method, in which:
an antenna device including
- a mobile terminal antenna that receives a radio wave output by a reader/writer provided in a mobile terminal,
- a plurality of IC card antennas that communicates with an IC card including an IC chip for the IC card that reads/writes data in a contactless manner in response to a command transmitted by the reader/writer, and
- a control circuit that operates by using power generated when the mobile terminal antenna receives the radio wave output by the reader/writer
controls enabling or disabling of each of the IC card antennas in response to the command transmitted by the reader/writer.

(13)

A program for causing a computer that controls a mobile terminal provided with a reader/writer to execute the processing of
transmitting, to an antenna device including a mobile terminal antenna that receives a radio wave output by the reader/writer, a plurality of IC card antennas that communicates with an IC card including an IC chip for the IC card that reads/writes data in a contactless manner in response to a command transmitted by the reader/writer, and a control circuit that operates by using power generated when the mobile terminal antenna receives the radio wave output by the reader/writer and controls enabling or disabling of each of the IC card antennas in response to the command transmitted by the reader/writer, the command for controlling enabling or disabling of the IC card antennas from the reader/writer.

REFERENCE SIGNS LIST

11 Antenna device
12 Smartphone
13 IC card
21 Control circuit
22 Smartphone antenna 23-1, 23-2 Extension antenna
31 Rectifier circuit
32 Reset IC
33 Power supply IC
34 NFC IC
35 MCU
36 Switch control circuit
37-1, 37-2 Switch
41 Switch
51 NFC reader/writer
101 Antenna layer
102 Magnetic layer
103 Metal layer
111 LED
301 Control unit
301A Application execution unit

The invention claimed is:

1. An antenna device comprising:
a mobile terminal antenna that receives a radio wave output by a reader/writer provided in a mobile terminal;
a plurality of IC card antennas that communicates with an IC card including an IC chip for the IC card that reads/writes data in a contactless manner in response to a command transmitted by the reader/writer; and
a control circuit that operates by using power generated when the mobile terminal antenna receives the radio wave output by the reader/writer and controls enabling or disabling of each IC card antenna of the plurality of IC card antennas in response to the command transmitted by the reader/writer,
wherein the control circuit includes
a switch that is connected to each IC card antenna of the plurality of IC card antennas and switches enabling or disabling of the plurality of IC card antennas,
a controller that controls the switch, and
an internal IC chip that controls operation of the controller in response to the command and reads/writes data in a contactless manner in response to the command.

2. The antenna device according to claim 1, wherein in a case where an IC card antenna of the plurality of IC card antennas is enabled, the IC card antenna transmits the command supplied via the switch to the IC card and receives a response including identification information of the IC chip for the IC card transmitted from the IC card.

3. The antenna device according to claim 2, wherein the mobile terminal antenna transmits the response received by the IC card antenna to the mobile terminal.

4. The antenna device according to claim 3, wherein:
the internal IC chip supplies another response including identification information of the internal IC chip to the mobile terminal antenna in response to the supply of the command; and
the mobile terminal antenna transmits the another response supplied from the internal IC chip to the mobile terminal.

5. The antenna device according to claim 4, wherein the internal IC chip stops responding to the another response in response to supply of a disable command serving as the command.

6. The antenna device according to claim 4, wherein:
the controller further controls another switch provided between the mobile terminal antenna and the internal IC chip; and
the internal IC chip controls the operation of the controller to turn off the another switch in response to enabling of one IC card antenna of the plurality of IC card antennas.

7. The antenna device according to claim 1, wherein the controller controls light emission of a light emitting body.

8. The antenna device according to claim 4, wherein the identification information included in the another response is used in the mobile terminal as information for identifying the antenna device.

9. The antenna device according to claim 1, wherein the antenna device has a layered structure including
an antenna layer on which the plurality of IC card antennas and the mobile terminal antenna are provided,
a magnetic layer made from a magnetic material and provided on a bottom surface side of the antenna layer, and
a metal layer made from a metal material and provided on a bottom surface side of the magnetic layer.

10. The antenna device according to claim 1, wherein:
a section for placing the mobile terminal is provided on a surface of the antenna device corresponding to a position of the mobile terminal antenna; and
a section for placing the IC card is provided on the surface of the antenna device corresponding to a position of each IC card antenna of the plurality of IC card antennas.

11. A control method comprising:
transmitting, to an antenna device including a mobile terminal antenna that receives a radio wave output by a reader/writer provided in a mobile terminal, a plurality of IC card antennas that communicates with an IC card including an IC chip for the IC card that reads/writes data in a contactless manner in response to a command transmitted by the reader/writer, and a control circuit that operates by using power generated when the mobile terminal antenna receives the radio wave output by the reader/writer and controls enabling or disabling of each of the IC card antennas in response to the command transmitted by the reader/writer, the command for controlling enabling or disabling of the IC card antennas from the reader/writer,
wherein the control circuit includes a switch that is connected to each IC card antenna of the plurality of IC card antennas and switches enabling or disabling of the plurality of IC card antennas in response to the transmission of the command, a controller that controls the switch, and an internal IC chip that controls operation of the controller in response to the command and reads/writes data in a contactless manner in response to the command.

12. A non-transitory computer-readable medium having embodied thereon a program, which when executed by a computer causes the computer to control a mobile terminal provided with a reader/writer to execute a control method, the method comprising:
transmitting, to an antenna device including a mobile terminal antenna that receives a radio wave output by the reader/writer, a plurality of IC card antennas that communicates with an IC card including an IC chip for the IC card that reads/writes data in a contactless manner in response to a command transmitted by the reader/writer, and a control circuit that operates by using power generated when the mobile terminal antenna receives the radio wave output by the reader/writer and controls enabling or disabling of each of the IC card antennas in response to the command transmitted by the reader/writer, the command for controlling enabling or disabling of the IC card antennas from the reader/writer, wherein the control circuit includes a switch that is connected to each IC card antenna of the plurality of IC card antennas and switches enabling or disabling of the plurality of IC card antennas in response to the transmission of the command, a controller that controls the switch, and an internal IC chip that controls operation of the controller in response to the command and reads/writes data in a contactless manner in response to the command.

* * * * *